United States Patent
Liang et al.

(10) Patent No.: US 11,249,691 B2
(45) Date of Patent: Feb. 15, 2022

(54) DATA JUDGING METHOD APPLIED IN DISTRIBUTED STORAGE SYSTEM AND DISTRIBUTED STORAGE SYSTEM

(71) Applicants: BOE Technology Group Co., Ltd., Beijing (CN); Chongqing BOE Optoelectronics Technology Co., Ltd., Chongqing (CN)

(72) Inventors: Xuan Liang, Beijing (CN); Rui Wang, Beijing (CN); Xiao Chu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 713 days.

(21) Appl. No.: 16/304,554

(22) PCT Filed: Mar. 9, 2018

(86) PCT No.: PCT/CN2018/078489
§ 371 (c)(1),
(2) Date: Nov. 26, 2018

(87) PCT Pub. No.: WO2018/233321
PCT Pub. Date: Dec. 27, 2018

(65) Prior Publication Data
US 2021/0223960 A1   Jul. 22, 2021

(30) Foreign Application Priority Data
Jun. 21, 2017 (CN) .......................... 201710474101.6

(51) Int. Cl.
G06F 16/00 (2019.01)
G06N 3/02 (2006.01)
(Continued)

(52) U.S. Cl.
CPC ............ *G06F 3/067* (2013.01); *G06F 3/0623* (2013.01); *G06F 3/0653* (2013.01); *G06F 21/602* (2013.01); *H04L 29/06659* (2013.01)

(58) Field of Classification Search
None
See application file for complete search history.

(56) References Cited

U.S. PATENT DOCUMENTS

2011/0107112 A1  5/2011  Resch
2014/0230066 A1* 8/2014  Hurwitz ............... H04L 63/102
                                                726/26
(Continued)

FOREIGN PATENT DOCUMENTS

| CN | 106027552 | 10/2016 |
| CN | 106446707 | 2/2017 |
| CN | 107277141 | 10/2017 |

OTHER PUBLICATIONS

International Search Report and Written Opinion of the International Searching Authority corresponding to International Patent Application No. PCT/CN2018/078489, dated May 28, 2018. (16 pages).

*Primary Examiner* — Christopher C Harris
*Assistant Examiner* — Kalish K Bell
(74) *Attorney, Agent, or Firm* — Myers Bigel, P.A.

(57) ABSTRACT

This disclosure discloses a data judging method applied in a distributed storage system and the distributed storage system. The distributed storage system includes a plurality of processing units and a plurality of storage units corresponding to each processing unit. The data judging method prescribes that a processing unit corresponding to a storage unit that stores preset data is a first processing unit, the storage unit that stores the preset data corresponding to the first processing unit is a first storage unit, other storage units corresponding to the first processing unit except for the first (Continued)

storage unit are second storage units. The data judging method provided by this disclosure may judge whether the preset data needs to be encrypted. Thus, privacy protection may be performed to preset data that needs to be encrypted, without performing encryption protection to all data, thereby being capable of utilizing data reasonably.

20 Claims, 3 Drawing Sheets

(51) Int. Cl.
  *G06F 3/06* (2006.01)
  *G06F 21/60* (2013.01)
  *H04L 29/06* (2006.01)

(56) References Cited

U.S. PATENT DOCUMENTS

| 2014/0279770 A1* | 9/2014 | Xaypanya | G06N 20/00 |
| | | | 706/15 |
| 2017/0264531 A1* | 9/2017 | Mahyar | G06N 5/003 |
| 2019/0114554 A1* | 4/2019 | Chen | G06N 20/10 |

* cited by examiner

DATA JUDGING METHOD APPLIED IN DISTRIBUTED STORAGE SYSTEM AND DISTRIBUTED STORAGE SYSTEM

CROSS REFERENCE TO RELATED APPLICATIONS

The present application is a 35 U.S.C. 371 national stage application of PCT International Application No. PCT/CN2018/078489, filed on Mar. 9, 2018, which claims the benefit of Chinese patent application No. 201710474101.6, filed on Jun. 21, 2017, the contents of which are incorporated herein by reference in their entireties.

TECHNICAL FIELD

This disclosure relates to the field of computer technology, particularly to a data judging method applied in a distributed storage system and a distributed storage system.

BACKGROUND

With the development of science and technology, data stored in various fields are becoming larger and larger. At present, the existing single storage space is difficult to meet the requirement of big data. In order to solve the storage problem of big data, distributed storage manner is generally adopted. However, some of the stored data needs to be encrypted when being called, whereas the existing distributed storage manner cannot judge in advance whether the called data needs to be encrypted. In this regard, one practice in the prior art is that none of the called data is encrypted. The result of such a practice is that there is no protection to data therein that needs to be encrypted. Another practice in the prior art is that all data is encrypted in order to protect data that needs to be encrypted, such a practice results in unreasonable utilization of data.

SUMMARY

An embodiment of this disclosure provides a data judging method applied in a distributed storage system and a distributed storage system, for solving the problem of utilizing data unreasonably in the prior art.

According to an aspect of this disclosure, a data judging method applied in a distributed storage system is provided. The distributed storage system can comprise: a plurality of processing units and a plurality of storage units corresponding to each processing unit. The data judging method prescribes that a processing unit corresponding to a storage unit that stores preset data is a first processing unit, the storage unit that stores the preset data corresponding to the first processing unit is a first storage unit, other storage units corresponding to the first processing unit except for the first storage unit are second storage units. The data judging method can comprise:

determining a corresponding first encryption probability of the preset data at a current moment based on historical interaction information of the first storage unit and other storage units in the distributed storage system;

determining a corresponding second encryption probability of the preset data at the current moment based on historical interaction information between each second storage unit corresponding to the first processing unit and other storage units in the distributed storage system except for the first storage unit;

determining an encryption probability that the preset data needs to be encrypted at the current moment based on the first encryption probability and the second encryption probability;

determining whether the preset data needs to be encrypted based on the determined encryption probability that the preset data needs to be encrypted at the current moment.

In an embodiment, in the above data judging method provided by an embodiment of this disclosure, determining a corresponding second encryption probability of the preset data at the current moment can comprise:

determining the second encryption probability I according to a following formula:

$$\begin{cases} I = \sum_{i=1}^{n} w_i I_i \\ \sum_{i=1}^{n} w_i = 1 \end{cases}.$$

In this embodiment, n represents the number of the second storage units corresponding to the first processing unit; $I_i$ is a corresponding indirect encryption probability of the preset data at the current moment determined based on the historical interaction information between a ith second storage unit corresponding to the first processing unit and other storage units in the distributed storage system except for the first storage unit; $w_i$ represents a weight occupied by the indirect encryption probability determined with respect to the ith second storage unit.

In an embodiment, in the above data judging method provided by an embodiment of this disclosure, $w_i$ is determined based on a historical interaction frequency between a ith second storage unit and other storage units in the distributed storage system except for the first storage unit.

In an embodiment, in the above data judging method provided by an embodiment of this disclosure, determining an encryption probability that the preset data needs to be encrypted at the current moment based on the first encryption probability and the second encryption probability can comprise:

determining an encryption probability Y that the preset data needs to be encrypted at the current moment based on a following formula:

$$\begin{cases} Y = \delta_1 D + \delta_2 I \\ \delta_1 + \delta_2 = 1 \end{cases},$$

wherein D represents the first encryption probability, I represents the second encryption probability, $\delta_1$ represents a weight occupied by the first encryption probability, $\delta_2$ represents a weight occupied by the second encryption probability.

In an embodiment, in the above data judging method provided by an embodiment of this disclosure, $\delta_1$ is set based on the historical interaction information of the first storage unit.

In an embodiment, in the above data judging method provided by an embodiment of this disclosure, determining whether the preset data needs to be encrypted based on the determined encryption probability that the preset data needs to be encrypted at the current moment can comprise:

comparing the determined encryption probability that the preset data needs to be encrypted at the current moment with a predefined threshold value;

determining that the preset data needs to be encrypted if the encryption probability is greater than or equal to the threshold value;

determining that the preset date does not need to be encrypted if the encryption probability is less than the threshold value.

According to another aspect of this disclosure, a distributed storage system is provided. The distributed storage system can comprise a plurality of processing units and a plurality of storage units corresponding to each of the processing units. In the distributed storage system, it is prescribed that a processing unit corresponding to a storage unit that stores preset data is a first processing unit, the storage unit that stores the preset data corresponding to the first processing unit is a first storage unit, other storage units corresponding to the first processing unit except for the first storage unit are second storage units.

In an embodiment, the first processing unit can be used for determining a corresponding first encryption probability of the preset data at a current moment based on historical interaction information of the first storage unit and other storage units, in the distributed storage system; determining a corresponding second encryption probability of the preset data at the current moment based on historical interaction information between each second storage unit and other storage units in the distributed storage system except for the first storage unit; determining an encryption probability that the preset data needs to be encrypted at the current moment based on the first encryption probability and the second encryption probability; and determining whether the preset data needs to be encrypted based on the determined encryption probability that the preset data needs to be encrypted at the current moment.

In an embodiment, in the above distributed storage system provided by an embodiment of this disclosure, the first processing unit determining a corresponding second encryption probability of the preset data at the current moment can comprise:

determining the second encryption probability I according to a following formula:

$$\begin{cases} I = \sum_{i=1}^{n} w_i I_i \\ \sum_{i=1}^{n} w_i = 1 \end{cases}$$

In this formula, n represents the number of the second storage units corresponding to the first processing unit; $I_i$ is a corresponding indirect encryption probability of the preset data at the current moment determined based on the historical interaction information between a ith second storage unit corresponding to the first processing unit and other storage units in the distributed storage system except for the first storage unit; $w_i$ represents a weight occupied by the indirect encryption probability determined with respect to the ith second storage unit.

In an embodiment, in the above distributed storage system provided by an embodiment of this disclosure, $w_i$ is determined based on a historical interaction frequency between the ith second storage unit and other storage units in the distributed storage system except for the first storage unit.

In an embodiment, in the above distributed storage system provided by an embodiment of this disclosure, the first processing unit determining an encryption probability that the preset data needs to be encrypted at the current moment based on the first encryption probability and the second encryption probability can comprise:

determining an encryption probability Y that the preset data needs to be encrypted at the current moment based on a following formula:

$$\begin{cases} Y = \delta_1 D + \delta_2 I \\ \delta_1 + \delta_2 = 1 \end{cases}$$

In this formula, D represents the first encryption probability, I represents the second encryption probability, $\delta_1$ represents a weight occupied by the first encryption probability, $\delta_2$ represents a weight occupied by the second encryption probability.

In an embodiment, in the above distributed storage system provided by an embodiment of this disclosure, $\delta_1$ is set based on the historical interaction information of the first storage unit.

In an embodiment, in the above distributed storage system provided by an embodiment of this disclosure, the first processing unit determining whether the preset data needs to be encrypted based on the determined encryption probability that the preset data needs to be encrypted at the current moment can comprise:

comparing the determined encryption probability that the preset data needs to be encrypted at the current moment with a predefined threshold value;

determining that the preset data needs to be encrypted if the encryption probability is greater than or equal to the threshold value;

determining that the preset data does not need to be encrypted if the encryption probability is less than the threshold value.

In an embodiment, the first storage unit is used for encrypting the preset data when the first processing unit determines that the preset data needs to be encrypted.

According to a further aspect of this disclosure, a computer readable storage medium is provided on which computer executable instructions are stored. When running on a computer, the computer executable instructions enable the computer to carry out the data judging method as mentioned above.

DETAILED DESCRIPTION

In order to make the objects, technical solutions and advantages of this disclosure to be clearer, specific implementations of the data judging method applied in a distributed storage system and the distributed storage system provided by embodiments of this disclosure will be explained below in detail in conjunction with the drawings.

Embodiments of this disclosure provide a data judging method applied in a distributed storage system, a distributed storage system and a computer readable storage medium. The distributed storage system can comprise: a plurality of processing units and a plurality of storage units corresponding to each processing unit. The data judging method prescribes that a processing unit corresponding to a storage unit that stores preset data is a first processing unit, the storage unit that stores the preset data corresponding to the first processing unit is a first storage unit, other storage units corresponding to the first processing unit except for the first storage unit are second storage units. The data judging method can comprise: determining a corresponding first encryption probability of the preset data at a current moment based on historical interaction information of the first storage unit and other storage units in the distributed storage system; determining a corresponding second encryption probability of the preset data at the current moment based on historical interaction information between each second storage unit corresponding to the first processing unit and other storage units in the distributed storage system except for the first storage unit; determining an encryption probability that the preset data needs to be encrypted at the current moment based on the first encryption probability and the second encryption probability; determining whether the preset data needs to be encrypted based on the determined encryption probability that the preset data needs to be encrypted at the current moment. The data judging method provided by this disclosure can judge whether the preset data needs to be encrypted. Thus, privacy protection can only be performed to preset data that needs to be encrypted, without performing encryption protection to all data, thereby being capable of utilizing the data reasonably.

Figure 1:
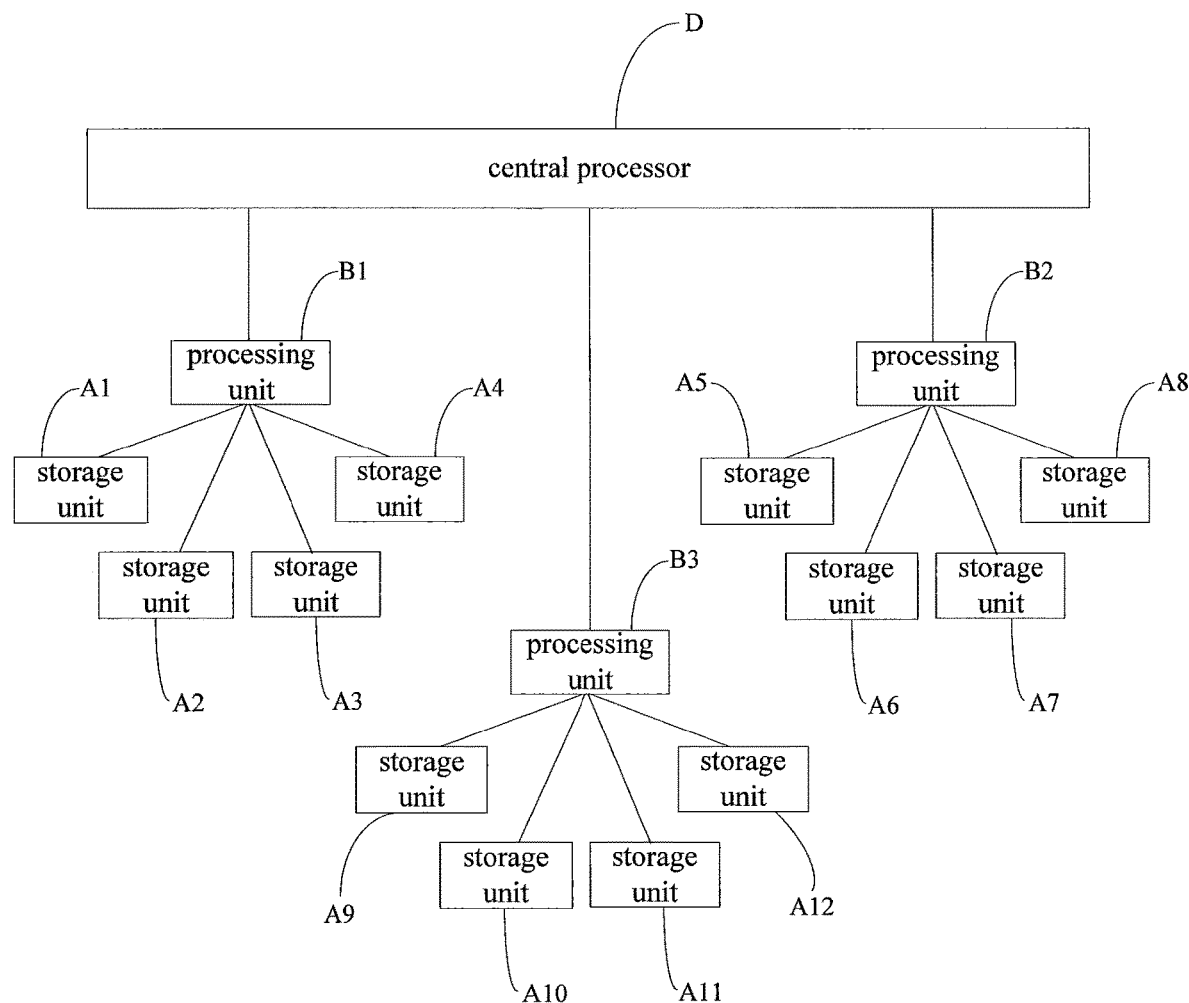
FIG. 1 is a structural schematic view of a distributed storage system in an embodiment of this disclosure.

FIG. 1 is a structural schematic view of a distributed storage system provided in an embodiment of this disclosure. As shown in FIG. 1, the distributed storage system can comprise: a central processor D, a plurality of processing units (e.g., B1~B3), and a plurality of storage units corresponding to each processing unit (B1, B2 or B3) (for example, four storage units A1~A4 corresponding to the processing unit B1, four storage units A5~A8 corresponding to the processing unit B2, and four storage units A9~A12 corresponding to the processing unit B3). In an embodiment, it is prescribed that a processing unit corresponding to a storage unit that stores preset data is a first processing unit (for example, the storage unit A2 stores preset data, i.e., the processing unit B1 corresponding to the storage unit A2 is the first processing unit), the storage unit that stores the preset data corresponding to the first processing unit is a first storage unit (i.e., the storage unit A2 is the first storage unit), other storage units corresponding to the first processing unit except for the first storage unit are second storage units (i.e., the storage units A1, A3 and A4 corresponding to the first processing unit B1 are all second storage units).

Figure 2:
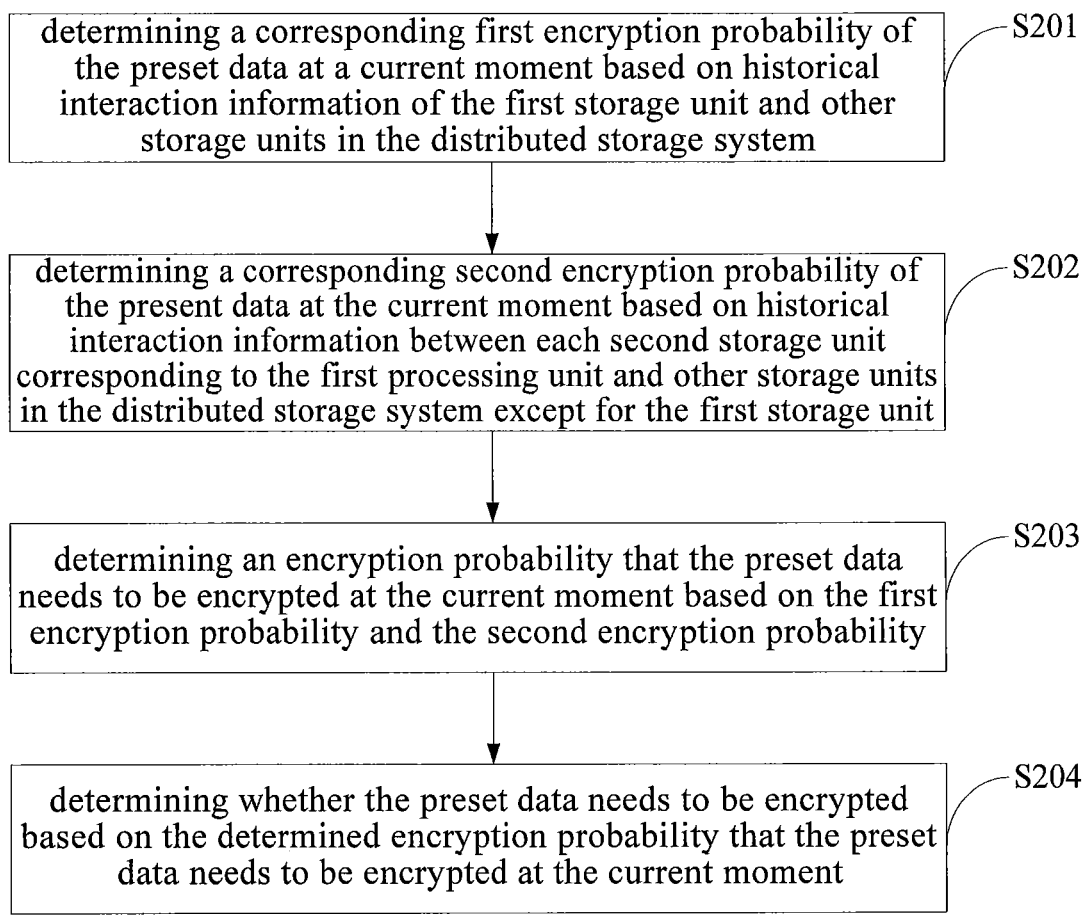
FIG. 2 is a flow chart of a data judging method applied in a distributed storage system in an embodiment of this disclosure.

FIG. 2 is a flow chart of a data judging method applied in a distributed storage system in an embodiment of this disclosure. The data judging method is applied in for example the distributed storage system as shown in FIG. 1. As shown in FIG. 2, the data judging method can comprise:

S201, determining a corresponding first encryption probability of the preset data at a current moment based on historical interaction information of the first storage unit and other storage units in the distributed storage system;

S202, determining a corresponding second encryption probability of the preset data at the current moment based on historical interaction information between each storage unit corresponding to the first processing unit and other storage units in the distributed storage system except for the first storage unit;

S203, determining an encryption probability that the preset data needs to be encrypted at the current moment based on the first encryption probability and the second encryption probability;

S204, determining whether the preset data needs to be encrypted based on the determined encryption probability that the preset data needs to be encrypted at the current moment.

The data judging method applied in a distributed storage system provided by an embodiment of this disclosure determines a corresponding first encryption probability of the preset data at a current moment based on historical interaction information of the first storage unit and other storage units in the distributed storage system; determines a corresponding second encryption probability of the preset data at the current moment based on historical interaction information between each second storage unit corresponding to the first processing unit and other storage units in the distributed storage system except for the first storage unit; determines an encryption probability that the preset data needs to be encrypted at the current moment based on the first encryption probability and the second encryption probability; and determines whether the preset data needs to be encrypted based on the determined encryption probability that the preset data needs to be encrypted at the current moment. The data judging method provided by this disclosure can judge whether the preset data needs to be encrypted. Thus, privacy protection can only be performed to preset data that needs to be encrypted, without performing encryption protection to all data, thereby being capable of utilizing the data reasonably.

In specific implementation, for example, the distributed storage system can be applied in data management of hospitals. When preset data that needs to be called is a patient's case, the privacy of the preset data can be judged based on historical interaction information of the storage unit (e.g., the case storage unit) that stores the preset data and other storage units (e.g., a medicine storage unit, a charging record storage unit, a surgical treatment record storage unit etc.) in the distributed storage system, so as to determine a first encryption probability of the preset data at the current moment. Because the second storage units and the first storage unit that stores the preset data correspond to the same processing unit, the privacy of the preset data can also be judged indirectly based on the historical interaction information of the second storage units, so as to determine a second encryption probability of the preset data at the current moment, thereby determining a final encryption probability of the preset data based on the first encryption probability and the second encryption probability.

In specific implementation, in the above data judging method provided by an embodiment of this disclosure, determining a corresponding second encryption probability of the preset data at the current moment can comprise:

determining the second encryption probability I according to a following formula:

$$\begin{cases} I = \sum_{i=1}^{n} w_i I_i \\ \sum_{i=1}^{n} w_i = 1 \end{cases}.$$

In this formula, n represents the number of the second storage units corresponding to the first processing unit; $I_i$ is a corresponding indirect encryption probability of the preset data at the current moment determined based on historical interaction information between a ith second storage unit corresponding to the first processing unit and other storage units in the distributed storage system except for the first storage unit; $w_i$ represents a weight occupied by the indirect encryption probability determined with respect to the ith second storage unit.

In a specific implementation, in the above data judging method provided by an embodiment of this disclosure, $w_i$ is determined based on the historical interaction frequency between a ith second storage unit and other storage unit in the distributed storage system except for the first storage unit. The larger the historical interaction frequency is, the more important the preset data is, the larger the $w_i$ value is, the larger the weight occupied by indirect encryption probability determined with respect to the ith second storage unit is.

In a specific implementation, in the above data judging method provided by an embodiment of this disclosure, determining an encryption probability that the preset data needs to be encrypted at the current moment based on the first encryption probability and the second encryption probability can comprise:

Determining, based on a following formula, an encryption probability Y that the preset data needs to be encrypted at the current moment:

$$\begin{cases} Y = \delta_1 D + \delta_2 I \\ \delta_1 + \delta_2 = 1 \end{cases}.$$

In this formula, D represents the first encryption probability, I represents the second encryption probability, $\delta_1$ represents a weight occupied by the first encryption probability, $\delta_2$ represents a weight occupied by the second encryption probability.

In a specific implementation, in the above data judging method provided by an embodiment of this disclosure, $\delta_1$ is set based on the historical interaction information of the first storage unit. For example, if the historical interaction information shows that the first storage unit that stores the preset data has a possibility of being under external attacks, it indicates that the historical interaction information of the first storage unit is not optimistic, and thus the value of $\delta_1$ will be reduced. Conversely, if the historical interaction information of the first storage unit behaves well, the value of $\delta_1$ will be increased. As such, influence of external attacks or internal attacks to judgment of data privacy can be prevented effectively.

In one embodiment, in the above data judging method provided by an embodiment of this disclosure, if the historical interaction information shows that historical interaction information within a continuous time period, of the first storage unit that stores the preset data has a tendency of being under external or internal attacks, $\delta_1=0$ and $\delta_2=1$ are taken, i.e., taking the second encryption probability as a unique judgment manner whether the preset data needs to be encrypted, so as to obtain the final encryption probability of the preset data.

Figure 3:
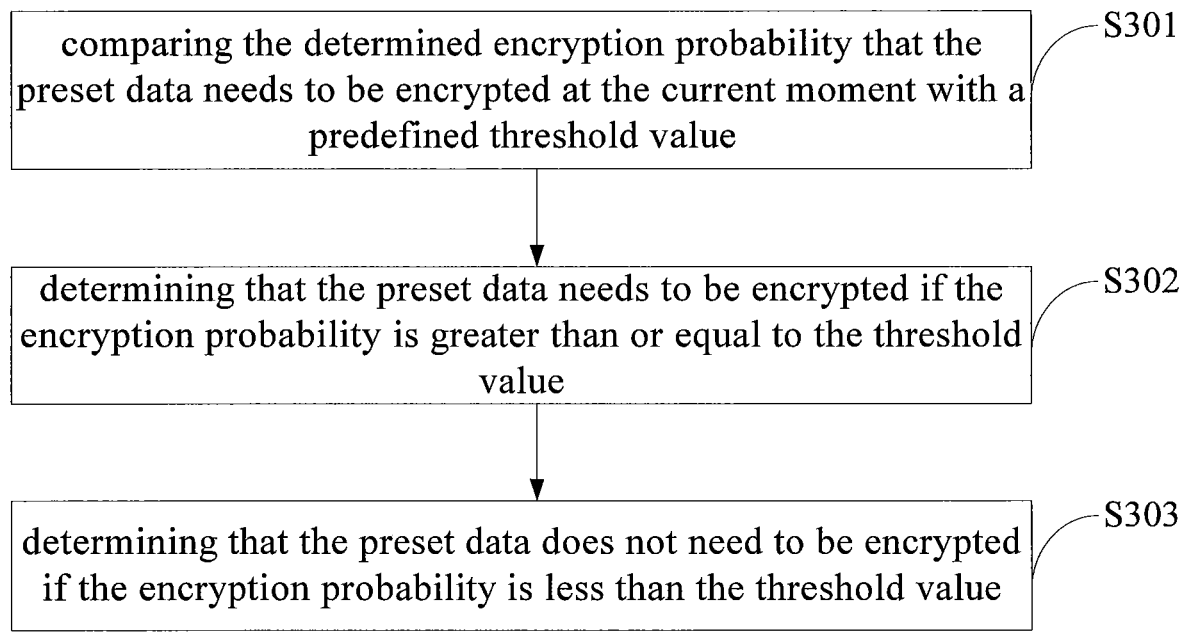
FIG. 3 is a flow chart of determining whether preset data needs to be encrypted in an embodiment of this disclosure.

In a specific implementation, in the above data judging method provided by an embodiment of this disclosure, determining whether the preset data needs to be encrypted based on the determined encryption probability that the preset data needs to be encrypted at the current moment, as shown in FIG. 3, can comprise:

S301, comparing the determined encryption probability that the preset data needs to be encrypted at the current moment with a predefined threshold value;

S302, determining that the preset data needs to be encrypted if the encryption probability is greater than or equal to the threshold value;

S303, determining that the preset date does not need to be encrypted if the encryption probability is less than the threshold value.

In a specific implementation, in the above data judging method provided by an embodiment of this disclosure, the above predefined threshold value is generally obtained based on empirical values, and can be set as 0.8 generally.

In a specific implementation, as shown in FIG. 1, the distributed storage system generally can further comprise a central processor D. when the central processor D calls the preset data, the central processor D will send a data call instruction to the processing units (B1~B3). Each processing unit (B1~B3), after receiving the instruction, will determine whether the preset data is stored by the storage unit (A1, A2 . . . A11 or A12) corresponding to it. If yes, the processing unit (B1, B2 or B3) will determine whether the preset data needs to be encrypted at the current moment based on the steps as shown in FIG. 1. If it needs to be encrypted, the storage unit (A1, A2 . . . A11 or A12) that stores the preset data will encrypt the preset data and then send the preset data to the central processor D through the processing unit (B1, B2 or B3) corresponding to it.

In a specific implementation, in the above data judging method provided by an embodiment of this disclosure, the storage unit also sends a decryption manner of the preset data while sending the encrypted preset data. Only in particular cases, can the decryption manner of the preset data be viewed, so as to achieve the purpose of protecting the privacy of the preset data.

Based on the same inventive concept, an embodiment of this disclosure further provides a distributed storage system. As shown in FIG. 1, the distributed storage system can comprise a plurality of processing units (e.g., B1~B3), and a plurality of storage units corresponding to each processing unit (B1, B2 or B3) (for example, four storage units A1~A4 corresponding to the processing unit B1, four storage units A5~A8 corresponding to the processing unit B2, and four storage units A9~A12 corresponding to the processing unit B3). In the distributed storage system, it is prescribed that a processing unit corresponding to a storage unit that stores preset data is a first processing unit (for example, the storage unit A2 stores preset data, i.e., the processing unit B1 corresponding to the storage unit A2 is the first processing unit), the storage unit corresponding to the first processing unit that stores the preset data is a first storage unit (i.e., the storage unit A2 is the first storage unit), other storage units corresponding to the first processing unit except for the first storage unit are second storage units, i.e., the storage units A1, A3 and A4 corresponding to the first processing unit B1 are all second storage units.

In an embodiment, the first processing unit can be used for determining a corresponding first encryption probability of preset data at a current moment based on historical interaction information of the first storage unit and other storage units in the distributed storage system; determining a corresponding second encryption probability of the preset data at the current moment based on historical interaction information between each second storage unit and other storage units in the distributed storage system except for the first storage unit; determining an encryption probability that the preset data needs to be encrypted at the current moment based on the first encryption probability and the second encryption probability; and determining whether the preset data needs to be encrypted based on the determined encryption probability that the preset data needs to be encrypted at the current moment.

In an embodiment, the first storage unit can be used for encrypting the preset data when the first processing unit determines that the preset data needs to be encrypted.

In a specific implementation, in the above distributed storage system provided by an embodiment of this disclosure, the first processing unit determining a corresponding second encryption probability of the preset data at the current moment can comprise:

determining the second encryption probability I according to the following formula:

$$\begin{cases} I = \sum_{i=1}^{n} w_i I_i \\ \sum_{i=1}^{n} w_i = 1 \end{cases}.$$

In this formula, n represents the number of the second storage units corresponding to the first processing unit; $I_i$ is a corresponding indirect encryption probability of the preset data at the current moment determined based on the historical interaction information between a ith second storage unit corresponding to the first processing unit and other storage units in the distributed storage system except for the first storage unit; and $w_i$ represents a weight occupied by the indirect encryption probability determined with respect to the ith second storage unit.

In a specific implementation, in the above distributed storage system provided by an embodiment of this disclosure, $w_i$ is determined based on the historical interaction frequency between a ith second storage unit and other storage units in the distributed storage system except for the first storage unit.

In a specific implementation, in the above distributed storage system provided by an embodiment of this disclosure, the first processing unit determining an encryption probability that the preset data needs to be encrypted at the current moment based on the first encryption probability and the second encryption probability can comprise:

determining an encryption probability Y that the preset data needs to be encrypted at the current moment based on the following formula:

$$\begin{cases} Y = \delta_1 D + \delta_2 I \\ \delta_1 + \delta_2 = 1 \end{cases},$$

wherein, D represents the first encryption probability, I represents the second encryption probability, $\delta_1$ represents a weight occupied by the first encryption probability, $\delta_2$ represents a weight occupied by the second encryption probability.

In a specific implementation, in the above distributed storage system provided by an embodiment of this disclosure, $\delta_1$ is set based on the historical interaction information of the first storage unit.

In a specific implementation, in the above distributed storage system provided by an embodiment of this disclosure, the first processing unit determining whether the preset data needs to be encrypted based on the determined encryption probability that the preset data needs to be encrypted at the current moment can comprise:

comparing the determined encryption probability that the preset data needs to be encrypted at the current moment with a predefined threshold value;

determining that the preset data needs to be encrypted if the encryption probability is greater than or equal to the threshold value; and determining that the preset data does not need to be encrypted if the encryption probability is less than the threshold value.

In addition, in an embodiment, the data judging method according to an embodiment of this disclosure can be carried out as computer executable instructions stored on a computer readable storage medium. When running on the computer, the computer executable instructions enable the computer to carry out the data judging method according to an embodiment of this disclosure.

The embodiments of this disclosure provide a data judging method applied in a distributed storage system, a distributed storage system and a computer readable storage medium. The distributed storage system can comprise: a plurality of processing units and a plurality of storage units corresponding to each processing unit. The data judging method prescribes that a processing unit corresponding to a storage unit that stores preset data is a first processing unit, the storage unit that stores the preset data corresponding to the first processing unit is a first storage unit, other storage units corresponding to the first processing unit except for the first storage unit are second storage units. The data judging method can comprise: determining a corresponding first encryption probability of the preset data at a current moment based on historical interaction information of the first storage unit and other storage units in the distributed storage system; determining a corresponding second encryption probability of the preset data at the current moment based on historical interaction information between each second storage unit corresponding to the first processing unit and other storage units in the distributed storage system except for the first storage unit; determining an encryption probability that the preset data needs to be encrypted at the current moment based on the first encryption probability and the second encryption probability; and determining whether the preset data needs to be encrypted based on the determined encryption probability that the preset data needs to be encrypted at the current moment. The data judging method provided by this disclosure can judge whether the preset data needs to be encrypted. Thus, privacy protection can only be performed to preset data that needs to be encrypted, without performing encryption protection to all data, thereby being capable of utilizing the data reasonably.

Apparently, the skilled person in the art can make various modifications and variations to this disclosure without departing from the spirit and scope of this disclosure. In this way, provided that these modifications and variations of this disclosure are within the scope of the claims of this disclosure and the equivalent technologies thereof, this disclosure also intends to encompass these modifications and variations.

The invention claimed is:

1. A data judging method applied in a distributed storage system, the distributed storage system comprising a plurality of processing units and a plurality of storage units corresponding to ones of the plurality of processing units, wherein a first processing unit of the plurality of processing units corresponds to a first storage unit of the plurality of storage units that stores preset data, and wherein other ones of the plurality of storage units corresponding to the first processing unit comprise second storage units, the data judging method comprising:

determining a first encryption probability of the preset data at a current moment based on historical interaction information of the first storage unit and the other ones of the plurality of storage units in the distributed storage system;

determining a second encryption probability of the preset data at the current moment based on historical interaction information between ones of the second storage units and the other ones of the plurality of storage units in the distributed storage system;

determining a third encryption probability that the preset data needs to be encrypted at the current moment based on the first encryption probability and the second encryption probability; and determining whether the preset data needs to be encrypted based on the third encryption probability that the preset data needs to be encrypted at the current moment that was determined.

2. The judging method of claim 1, wherein determining a second encryption probability of the preset data at the current moment comprises:

determining the second encryption probability I according to a following formula:

$$\begin{cases} I = \sum_{i=1}^{n} w_i I_i \\ \sum_{i=1}^{n} w_i = 1 \end{cases},$$

wherein n represents a number of the second storage units corresponding to the first processing unit, wherein $I_i$ is a corresponding indirect encryption probability of the preset data at the current moment determined based on the historical interaction information between a ith second storage unit corresponding to the first processing unit and the other ones of the plurality of storage units in the distributed storage system except for the first storage unit, wherein $w_i$ represents a weight occupied by the indirect encryption probability determined with respect to the ith second storage unit.

3. The data judging method of claim 2, wherein $w_i$ is determined based on a historical interaction frequency between the ith second storage unit and the other ones of the plurality of storage units in the distributed storage system except for the first storage unit.

4. The data judging method of claim 1, wherein determining the third encryption probability that the preset data needs to be encrypted at the current moment based on the first encryption probability and the second encryption probability comprises:

determining an encryption probability Y that the preset data needs to be encrypted at the current moment based on a following formula:

$$\begin{cases} Y = \delta_1 D + \delta_2 I \\ \delta_1 + \delta_2 = 1 \end{cases},$$

wherein D represents the first encryption probability, wherein I represents the second encryption probability, wherein $\delta_1$ represents a first weight occupied by the first encryption probability, wherein $\delta_2$ represents a second weight occupied by the second encryption probability.

5. The data judging method of claim 4, wherein $\delta_1$ is set based on the historical interaction information of the first storage unit.

6. The data judging method of claim 1, wherein determining whether the preset data needs to be encrypted based on the third encryption probability that the preset data needs to be encrypted at the current moment comprises:

comparing the third encryption probability with a predefined threshold value;

determining that the preset data needs to be encrypted if the third encryption probability is greater than or equal to the predefined threshold value; and determining that the preset data does not need to be encrypted if the third encryption probability is less than the predefined threshold value.

7. A distributed storage system comprising a plurality of processing units; and a plurality of storage units corresponding to ones of the plurality of processing units, wherein a first processing unit of the plurality of processing units corresponds to a first storage unit of the plurality of processing units that stores preset data, and wherein other ones of the plurality of storage units corresponding to the first processing unit comprise second storage units, wherein, the first processing unit is configured to perform operations comprising:

determining a first encryption probability of the preset data at a current moment based on historical interaction information of the first storage unit and the other ones of the plurality of storage units in the distributed storage system;

determining a second encryption probability of the preset data at the current moment based on historical interaction information between ones of the second storage units and the other ones of the plurality of storage units in the distributed storage system;

determining a third encryption probability that the preset data needs to be encrypted at the current moment based on the first encryption probability and the second encryption probability; and determining whether the preset data needs to be encrypted based on the third encryption probability that the preset data needs to be encrypted at the current moment that was determined.

8. The distributed storage system of claim 7, wherein determining the second encryption probability of the preset data at the current moment comprises:

determining the second encryption probability I according to a following formula:

$$\begin{cases} I = \sum_{i=1}^{n} w_i I_i \\ \sum_{i=1}^{n} w_i = 1 \end{cases},$$

wherein n represents a number of the second storage units corresponding to the first processing unit, wherein $I_i$ is a corresponding indirect encryption probability of the preset data at the current moment determined based on the historical interaction information between a ith second storage unit corresponding to the first processing unit and the other ones of the plurality of storage units in the distributed storage system except for the first storage unit, wherein $w_i$ represents a weight occupied by the indirect encryption probability determined with respect to the ith second storage unit.

9. The distributed storage system of claim 8, wherein $w_i$ is determined based on a historical interaction frequency between the ith second storage unit and the other ones of the plurality of storage units in the distributed storage system except for the first storage unit.

10. The distributed storage system of claim 8, wherein determining the third encryption probability that the preset data needs to be encrypted at the current moment based on the first encryption probability and the second encryption probability comprises:
   determining an encryption probability Y that the preset data needs to be encrypted at the current moment based on a following formula:

$$\begin{cases} Y = \delta_1 D + \delta_2 I \\ \delta_1 + \delta_2 = 1 \end{cases},$$

wherein D represents the first encryption probability, wherein I represents the second encryption probability, wherein $\delta_1$ represents a first weight occupied by the first encryption probability, wherein $\delta_2$ represents a second weight occupied by the second encryption probability.

11. The distributed storage system of claim 10, wherein $\delta_1$ is set based on the historical interaction information of the first storage unit.

12. The distributed storage system of claim 7, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

13. The distributed storage system of claim 7, wherein the first storage unit is used for encrypting the preset data when the first processing unit determines that the preset data needs to be encrypted.

14. A computer readable storage medium on which computer executable instructions are stored, when running on a computer, the computer executable instructions cause the computer to perform operations of the data judging method of claim 1.

15. The data judging method of claim 2, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

16. The data judging method of claim 3, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

17. The data judging method of claim 4, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

18. The data judging method of claim 5, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

19. The distributed storage system of claim 8, wherein the first processing unit determining whether the preset data needs to be encrypted based on the determined encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

20. The distributed storage system of claim 9, wherein determining whether the preset data needs to be encrypted based on the third encryption probability that the preset data needs to be encrypted at the current moment comprises:
   comparing the third encryption probability with a predefined threshold value;
   determining that the preset data needs to be encrypted if the third encryption probability is greater than or equal to the predefined threshold value; and
   determining that the preset data does not need to be encrypted if the third encryption probability is less than the predefined threshold value.

* * * * *